United States Patent [19]

Groezinger et al.

[11] Patent Number: 4,859,328
[45] Date of Patent: Aug. 22, 1989

[54] TWIST ON DISPOSABLE FILTER

[75] Inventors: John J. Groezinger, Dunlap; Philip E. Moldenhauer, Peoria, both of Ill.

[73] Assignee: Caterpillar Inc., Peoria, Ill.

[21] Appl. No.: 868,481

[22] Filed: May 30, 1986

[51] Int. Cl.⁴ .......................................... B01D 27/08
[52] U.S. Cl. ................... 210/232; 210/440; 210/443; 210/450; 210/DIG. 17
[58] Field of Search .............. 210/232, 440, 443, 444, 210/450, D 17; 55/490, 502

[56]     References Cited
    U.S. PATENT DOCUMENTS

| | | | |
|---|---|---|---|
| 2,734,636 | 2/1956 | Foster | 210/DIG. 17 |
| 2,905,327 | 9/1959 | Phillips | 210/463 |
| 3,339,738 | 9/1967 | Wilhelm | 210/440 |
| 3,358,839 | 12/1967 | Simon | 210/232 |
| 3,405,805 | 10/1968 | Hatter | 210/440 |
| 4,052,307 | 10/1977 | Humbert, Jr. | 210/130 |
| 4,369,113 | 1/1983 | Stifelman | 210/440 |
| 4,371,439 | 2/1983 | Thornton | 210/232 |
| 4,617,118 | 10/1986 | Smart | 210/DIG. 17 |
| 4,623,456 | 11/1986 | Ratner | 210/232 |

FOREIGN PATENT DOCUMENTS 1297651 11/1972 United Kingdom .

Primary Examiner—Richard V. Fisher
Assistant Examiner—Wanda L. Millard
Attorney, Agent, or Firm—John W. Grant

[57]      ABSTRACT

Spin on disposable filters are useful in removing contaminates from the fluid of fluid systems. Preventing axial elongation of the filter due to fluid pressure therein requires the use of thicker elements, thereby increasing the manufacturing cost. The subject twist on disposable filter includes a twist-lock connector device which captures a portion of a housing between cooperating members of the twist-lock connector device. The area of imbalance caused by seal placement is greatly reduced by the twist-lock connector device, thereby minimizing the forces tending to cause axial elongation of the filter. This permits the use of less expensive materials therein and simplifies the manufacturing procedure.

8 Claims, 1 Drawing Sheet

U.S. Patent
Aug. 22, 1989
4,859,328
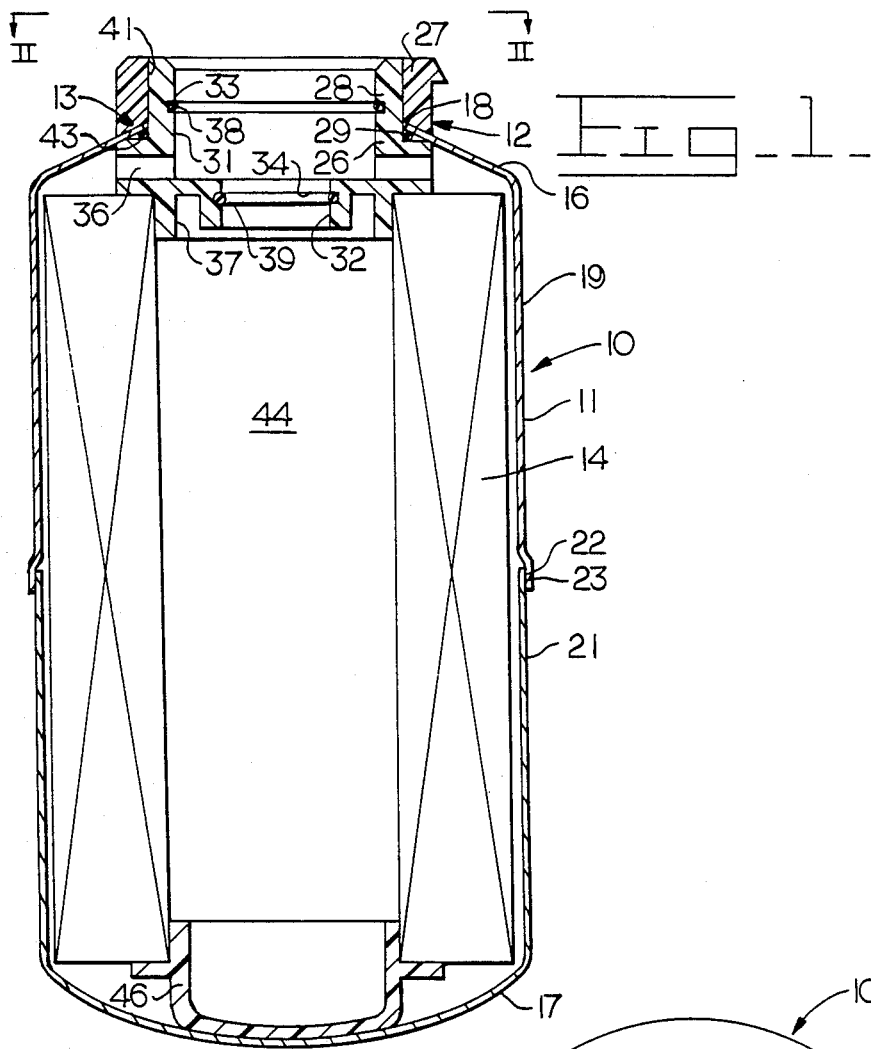
Fig_1_
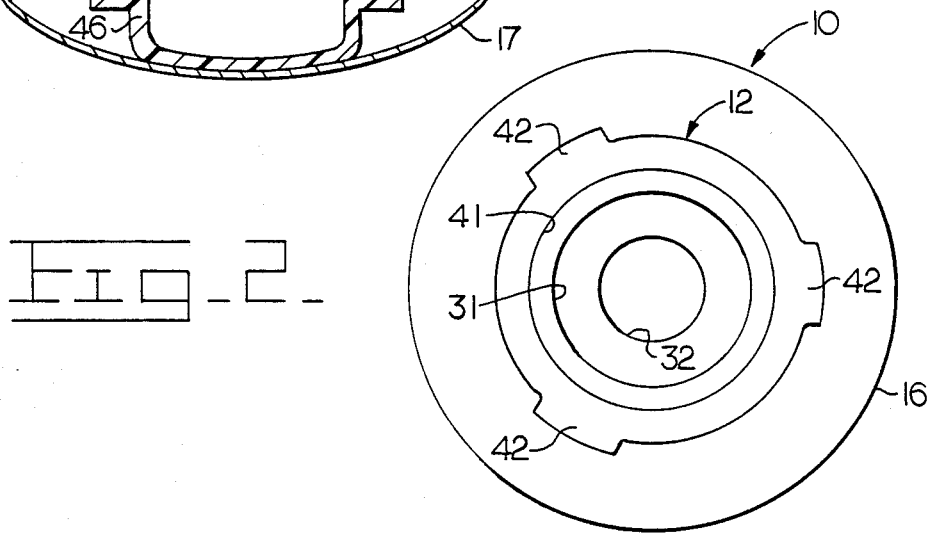
Fig_2_

TWIST ON DISPOSABLE FILTER

TECHNICAL FIELD

This invention relates generally to twist on disposable filters, and more particularly, to the interconnection between a twist-lock connector device and the housing containing the filter element.

BACKGROUND ART

Spin on disposable or throw away filters are commonly employed to filter contaminates from fluid systems such as engine and transmission lubrication systems, engine fuel systems, hydraulic systems, and so forth. Such filters generally include a filter element within a deep drawn, relatively thin cylindrical metal housing and a stamped metal cover plate attached to the open end of the housing typically by a rolled lock joint. A central threaded opening is provided in the cover plate for screwing the filter onto a threaded stud of a mounting base. Several openings are provided in the cover plate radially outwardly from the threaded opening for directing fluid through the filter element in the housing An annular gasket on the outside of the cover plate radially outside of the holes in the cover plate serves as an external seal between the filter and the mounting base.

The spin on filters are in essence a pressure vessel subjected to the system pressure One of the problems associated with the currently available spin on filters is that the placement of the seal outside the holes in the cover plate contribute to a large imbalance of forces acting within the filter which results in a rather large force acting on the end of the housing opposite to the cover plate. For example, with an 8 to 12 cm diameter filter at typical system hydraulic pressures, about 1000 kg of force is exerted on the end of the housing. This force is resisted only by the central threaded connection between the cover plate and the mounting base stud. In some applications, the force acting on the end of the housing is sufficient to cause axial elongation of the filter and distortion of the cover plate sufficient to allow leakage past the gasket. In other applications, the rolled lock joint has unfolded.

Various attempts have been made to strengthen the cover plate by making the cover plate from stronger materials, increasing the thickness of the cover plate, and adding reinforcing ribs to the cover plate. Some of those attempts have also included more exotic rolled lock joints. While such modifications to the existing filters have been somewhat effective, the major disadvantage is that all the modifications add to the cost of building the filter with the cost passed on to the customer through higher prices.

The present invention is directed to overcoming one or more of the problems as set forth above

DISCLOSURE OF THE INVENTION

In one aspect of the present invention, a twist on disposable filter comprises a generally cylindrical housing having opposite ends and an opening in one of the ends. A twist-lock connector means includes a first member having an extension protruding outside of the housing adjacent the opening. A means is provided for sealing between the twist-lock connector and the housing A filter element is disposed between the first member of the twist-lock connector means and the other end of the housing.

The present invention provides an improved twist on disposable filter constructed in a manner to reduce the imbalanced forces acting on the end of the filter to several hundred pounds. This permits the use of less expensive materials in the connector means for attaching the filter to the mounting base and greatly simplifies the steps of interconnecting the connector means to the housing, both of which greatly reduces the cost of making the filter relative to the current spin on filters.

BRIEF DESCRIPTION OF THE DRAWINGS

FIG. 1 is a cross section view of an embodiment of the present invention; and

FIG. 2 is an end view of the embodiment of FIG. 1

BEST MODE FOR CARRYING OUT THE INVENTION

A twist on disposable or throw away filter 10 includes housing 11, a twist-lock connector means 12, means 13 for sealing between the connector means 12 and the housing 11, and a filter element 14 disposed within the housing 11.

The housing is a generally cylindrical container having opposite ends 16,17 with the end 16 having an opening 18 therein. The housing 11 includes first and second cylindrical members 19,21 and an overlap joint 22 joining the first and second cylindrical members 19,21 together in substantially end-to-end relationship. The overlap joint includes an enlarged portion 23 provided on the first member 19 with the end of the second member 21 inserted within the enlarged portion. The members are nonrelelasably sealable joined together in this embodiment by a laser weld. However, other suitable processes can be employed to join the two members together The first and second members 19,21 are of generally thin walled construction formed by stamping or drawing from metal such as steel or other suitable material.

The twist-lock connector means 12 includes first and second members 26,27. The first member 26 is disposed partially within the housing 11 and has an extension 28 protruding through the opening 18 in the first cylindrical member 19 of the housing 11 and a generally radially outwardly extending annular shoulder 29 disposed within the housing and being in abutment with the inside surface of the housing 11 adjacent the opening 18. The first member 26 also has a pair of concentric bores 31,32, a pair of annular grooves 33,34 in the bore, a plurality of radially extending passages 36 extending from the bore 31 to the outer surface of the first member 26, and an axially extending portion 37. First and second resilient annular seals 38,39 are seated in the annular grooves 33,34, respectively.

The second member 27 of the twist-lock connector means 12 has a bore 41 provided therein and a plurality of circumferentially spaced radially outwardly extending lugs 42. The extension 28 of the first member 26 extends into the bore 41 and is secured to the second member 27. In this embodiment, the first and second members 26,27 are fastened together with a chemical bond. However, other methods of fastening the two members together may be employed. The second first member 19 of the housing 11 adjacent the opening 18 so that the portion of the housing adjacent the opening is trapped between the annular shoulder 29 and the second member 27. The first and second members in this embodiment are made of plastic, but could be made of other suitable material.

The means 13 for sealing is an annular resilient seal 43 disposed between the annular shoulder 29 of the first member 26 and the inside surface of the housing 11.

The filter element 14 in this embodiment is a pleated paper filter having a central passage 44 therein. The axially extending portion 37 of the first member 26 extends into the central passage 44 and is suitably sealably connected thereto. The filter element 14 includes a plug 46 at the other end thereof in abutment with the end 17 of the housing 11.

INDUSTRIAL APPLICABILITY

The twist on disposable filter 10 is assembled by initially sealably connecting the first member 26 of the twist-lock connector means 12 to the filter element 14. The annular seal 43 is positioned on the annular shoulder 29 of the first member 26 and the combined filter element, first member, and seal then inserted into the first cylindrical member 19 of the housing 11 so that the extension 28 protrudes through the opening 18 in the housing. The second cylindrical member 21 of the housing is inserted into the enlarged portion 23 of the first member 19 with the end 17 being in abutment with the filter element 14. Sufficient force is applied to the cylindrical member 21 to compress the annular seal 43. The enlarged portion 23 is then laser welded to the second member to form the overlap joint 22. A suitable chemical bonding agent is then applied to the extension 28 of the first member 26 and/or the bore 41 of the second member 27 and the second member then placed on the extension 28 in contact with the housing 11. The second member is held in place until the chemical bond sets.

In view of the foregoing, it is readily apparent that the structure of the present invention provides an improved twist on disposable filter which utilizes conventional and/or lightweight materials, thereby drastically reducing the cost of making the filter. Moreover, the imbalance of forces acting on the filter are minimized to thereby minimize the forces tending to axially elongate the filter.

Other aspects, objects, and advantages of this invention can be obtained from a study of the drawings, the disclosure, and the appended claims.

We claim:
1. A twist on disposable filter comprising:
   a generally cylindrical housing opposite ends and an opening in one of the ends;
   twist-lock connector means including a first member partially disposed within the housing and having an extension protruding outwardly through the opening in the housing and a generally radially outwardly extending annular shoulder disposed within the housing and being in abutment with an inside surface of the housing adjacent the opening, and a second member secured to the extension of the first member and being in abutment with an outside surface of the housing adjacent the opening;
   means for sealing between the twist-lock connector means and the housing; and
   a filter element disposed between the first member of the twist-lock connector means and the other end of the housing.

2. The twist on disposable filter of claim 1 wherein said sealing means includes an annular seal disposed between the annular shoulder and the inside surface of the housing.

3. A twist on disposable filter comprising:
   a generally cylindrical housing having opposite ends and an opening in one of the ends;
   twist-lock connector means including a first member having an extension protruding through the opening in the housing and a generally radially outwardly extending annular shoulder in abutment with an inside surface of the housing adjacent the of the housing adjacent the opening and having a cylindrical bore therein, said extending into the bore and being bonded to the second member;
   means for sealing between the twist-lock connector means and the housing; and
   a filter element disposed between the first member of the twist-lock connector means and the other end of the housing.

4. The twist on disposable filter of claim 3 wherein said extension is chemically bonded to the second member.

5. The twist on disposable filter of claim 3 wherein the first and second members are made of a plastic material.

6. The twist on disposable filter of claim 1 wherein said second member includes a plurality of circumferentially-spaced, radially outwardly extending lugs.

7. The twist on disposable filter of claim 3 wherein said housing includes first and second members and an overlap joint nonreleasably joining the members in substantially end-to-end relationship.

8. The twist on disposable filter of claim 7 wherein the first and second members of the housing are laser welded together.

* * * * *

UNITED STATES PATENT AND TRADEMARK OFFICE
CERTIFICATE OF CORRECTION

PATENT NO.  : 4,859,328

DATED       : August 22, 1989

INVENTOR(S) : John J. Groezinger and Philip E. Moldenhauer

It is certified that error appears in the above-identified patent and that said Letters Patent is hereby corrected as shown below:

Claim 3, line 9 of claim: before "of the housing", insert --opening, and a second member in abutment with an outside surface--.

Claim 3, line 10 of claim: after "said", insert --extension--.

Signed and Sealed this

Twenty-second Day of October, 1991

Attest:

HARRY F. MANBECK, JR.

*Attesting Officer*     *Commissioner of Patents and Trademarks*